June 25, 1935.  D. C. BLESER  2,005,770
HOP EXTRACTOR
Filed May 23, 1932
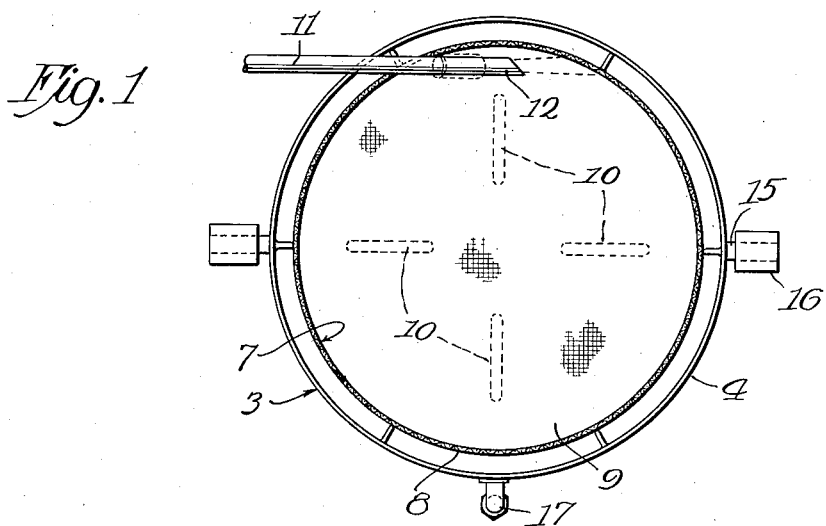
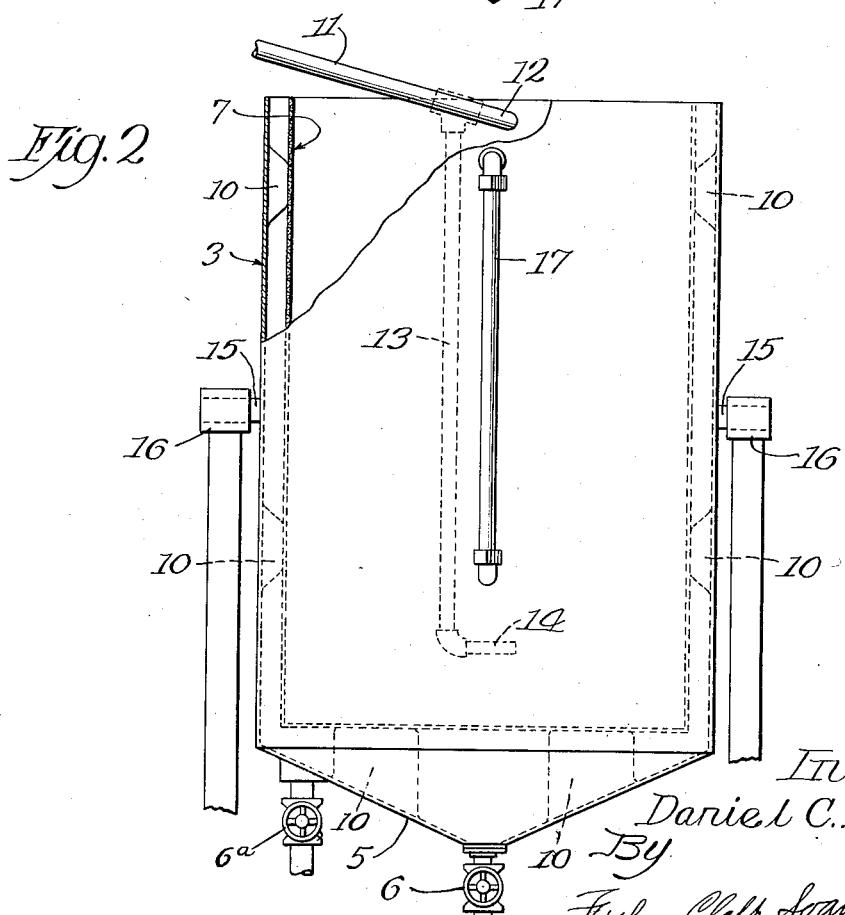
Inventor
Daniel C. Bleser
By
Fisher, Clapp, Soans & Pond
Attys.

Patented June 25, 1935

2,005,770

UNITED STATES PATENT OFFICE 2,005,770

HOP EXTRACTOR

Daniel C. Bleser, Manitowoc, Wis.

Application May 23, 1932, Serial No. 613,007

1 Claim. (Cl. 87—28)

This invention relates to improvements in hop extracting and has for its main object the provision of a method and apparatus whereby the desirable flavoring and other elements of hops may be extracted therefrom without also extracting certain rank, bitter principals which are undesirable and objectionable. It is also an object of this invention to provide an improved means for extracting hops which will require less time than the conventional practices now used.

In general, it is the object of this invention to provide an improved hop extracting method and apparatus, and other objects and advantages of the invention will be understood by reference to the following specification and accompanying drawing.

A hop extractor embodying a typical form of the improved construction is illustrated in the drawing wherein Fig. 1 is a plan, and
Fig. 2 is a side elevation.

Referring now to the drawing, the hop extractor therein illustrated includes a cylindrical, outer receptacle 3 which includes a side wall 4 and a bottom wall 5, the latter being dished toward the center and provided with a central outlet 6 and an offset outlet 6a, both of said outlets having suitable valves for closing the same. The outer receptacle or drum 3 may be formed of any suitable sheet metal such as steel, aluminum, or copper, and as indicated in the drawing it is open at its upper end.

An inner receptacle 7, also of cylindrical form, is formed of foraminous material, for example, screening made of copper, iron, tin, or other suitable metal, and it includes a side wall 8 and bottom 9. The top of the inner receptacle or strainer is open. As clearly indicated in the drawing, the inner receptacle 7 is somewhat smaller than the outer receptacle 3 and it is arranged substantially co-axially therewith so that the side and bottom walls of the inner receptacle are spaced from the side and bottom walls of the outer receptacle. Any suitable means, for example, fins 10 secured to the side and bottom walls of the outer receptacle, may be provided for maintaining the inner receptacle in said spaced relation.

The hop containing wort from which the wort is to be extracted is delivered to the inside of the inner receptacle by means of a delivery pipe 11 which is provided with a discharge end or nozzle 12 near the top of the extractor. The pipe 11 is arranged to deliver the hop containing wort in a stream directed against the inside of the foraminous side wall of the inner receptacle. As will be evident from an inspection of Fig. 1, the arrangement is such that the liquor is delivered to the inner receptacle along a line which approaches a tangent of the inner receptacle side wall.

When the wort is delivered by the means described, it will be caused to circulate around the inside of the inner receptacle or strainer and will, of course, flow downwardly along such side wall. When delivery of the hop containing wort occurs at a speed greater than the rate of separation, the accumulated wort will also be caused to circulate in the extractor. In so circulating or swirling around the inside of the strainer receptacle, centrifugal force incident to said circulation causes the wort to be separated from the hops which are retained in the strainer.

By the described method of separating the wort from the hops, a very rapid separation is effected which avoids the extraction of the undesirable rank, bitter principals of the hops such as occurs when the wort is caused to seep through a bed of hops in the bottom of a strainer. Also, the rapid separating method described avoids the production of certain objectionable tastes in the wort which result from oxidation of the hops in the bottom of a strainer and through which the wort seeps in the conventional extractors.

An important feature of the invention resides in the elimination of top closures. In the prior art, such closures prevent the escape of certain vapors given off from the hop wort and serve to condense such vapors which then drip back into the receptacle to seep through the hops. Such condensed vapors impart certain objectionable tastes and help to extract the objectionable, rank principals of the hops, and hence impair the quality of the strained wort. By omitting any top closure, the objectionable vapors which are given off are permitted to escape, and hence the impairment of the wort thereby produced is avoided.

For some purposes, the hop wort delivery pipe may be provided with an extension 13 having an outlet 14 adjacent the bottom of the receptacle, the outlet 14 being arranged in a manner similar to that described in connection with the outlet 12 so as to effect a swirling action of the hop wort in the extractor. Both outlets may be used if desired.

For securing certain flavoring effects of hops, dry hops, either imported or domestic, may be introduced into the extractor, and since the wort is quickly separated from the hops and not caused to contact with any oxidized hop material, certain desirable qualities of the dry hops are retained.

The described hop extractor is also useful in producing a so-called dry hop extraction which is used for flavoring of beverages. Such an extraction may be formed by permitting warm water to trickle through a quantity of hops in the bottom of the receptacle.

The described arrangement is effective to extract the valuable resins which produce fullness to the beverage to be produced and because of the rapid separation of the wort from the hops, the undesirable resins are not dissolved and extracted.

To facilitate cleaning of the extractor, it may be provided with trunnions such as indicated at 15, which are mounted in bearings 16 carried by suitable supporting standards. By the described mounting, the extractor may be tilted about the axes of the trunnions 15 to empty the trapped material preparatory to a succeeding operation. A gauge glass 17 may also be provided to facilitate the control of the supply of liquor to the extractor by indicating the quantity of liquor in the extractor.

During the operation of hop extracting, certain fine particles of hops pass through the screen and settle in the bottom of the outer receptacle. Because of the circular travel of the wort in the extractor, the hops in the inner receptacle settle or pile up in the center of the extractor and the fine sediment which passes through the strainer settles in the center of the dished or conical bottom of the outer receptacle partly because of the dished shape of the bottom and partly because of said circular travel of the liquor. The central outlet 6 may be opened to clean out the sediment and it may also be used instead of or in connection with the outlet 6a for drawing out the wort.

Because of the central accumulation of the spent hops on the bottom of the strainer, the side walls remain clean so that the straining operation is not materially slowed down even after a considerable period of operation. Cleaning of the strainer is also facilitated because of the said more or less localized accumulation of the spent hops. Another advantage resulting from the centralized accumulation of the spent hops, is that practically clear wort may be drawn off from the extractor through the outlet 6a which, being located adjacent the side of the extractor, is away from the zone in which the hops and fine sediment gather.

Changes may be made in the described construction without departing from the spirit of the invention, the scope of which should be determined by reference to the following claim, the same being construed as broadly as possible consistent with the state of the art.

I claim as my invention:

In a hop extractor, the combination of an axially elongated, vertical, substantially cylindrical strainer provided with a substantially flat strainer bottom member, a receptacle for receiving said strainer, said receptacle having an inverted conical bottom closure and the latter being provided with a centrally disposed, valved outlet opening and with a valved outlet opening adjacent the side wall of the receptacle, means for maintaining the strainer member in spaced relation to the receptacle wall and bottom, and means for tangentially delivering hop-containing wort to the inside of the strainer adjacent the upper end thereof so as to cause the hop-containing wort to flow horizontally and downwardly over the side wall of said strainer, whereby the liquid content of the hop-containing wort is separated from the solid content thereof by centrifugal force incident to the delivery of the hop-containing wort, the liquid being adapted to be drained from the receptacle through said last mentioned outlet opening, and fine particles of solid material which pass through said strainer and collect in the central portion of said receptacle bottom are adapted to be removed therefrom through said centrally disposed outlet.

DANIEL C. BLESER.